Nov. 5, 1968
S. J. JENNINGS
3,408,799
COTTON HARVESTING APPARATUS
Filed Sept. 19, 1966
2 Sheets-Sheet 1
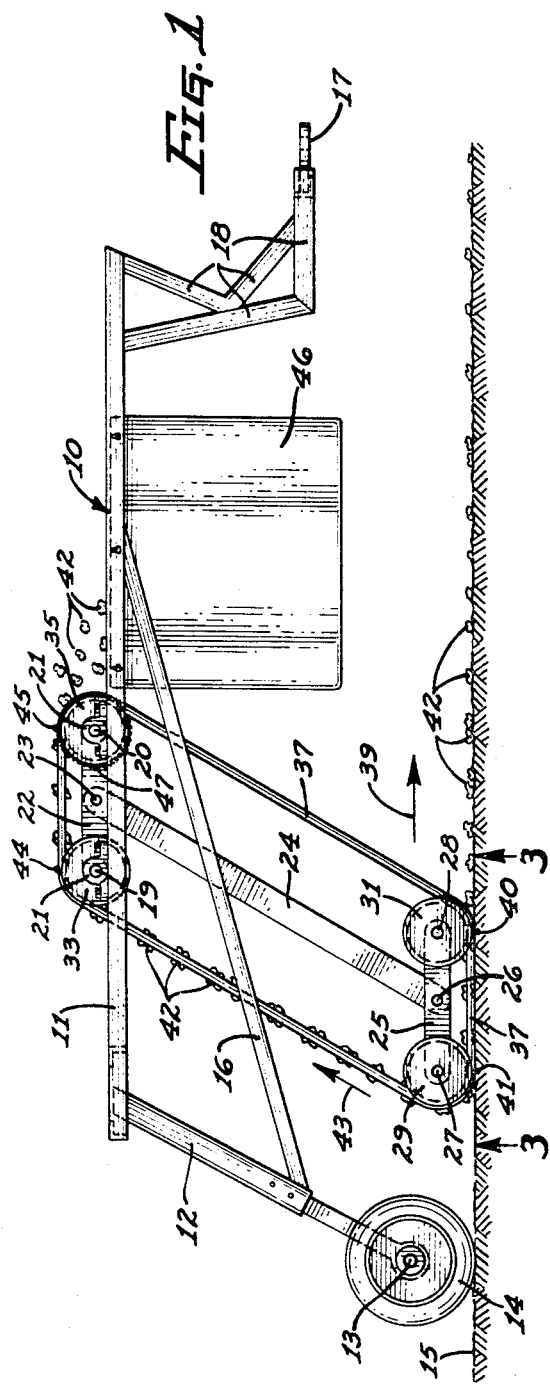
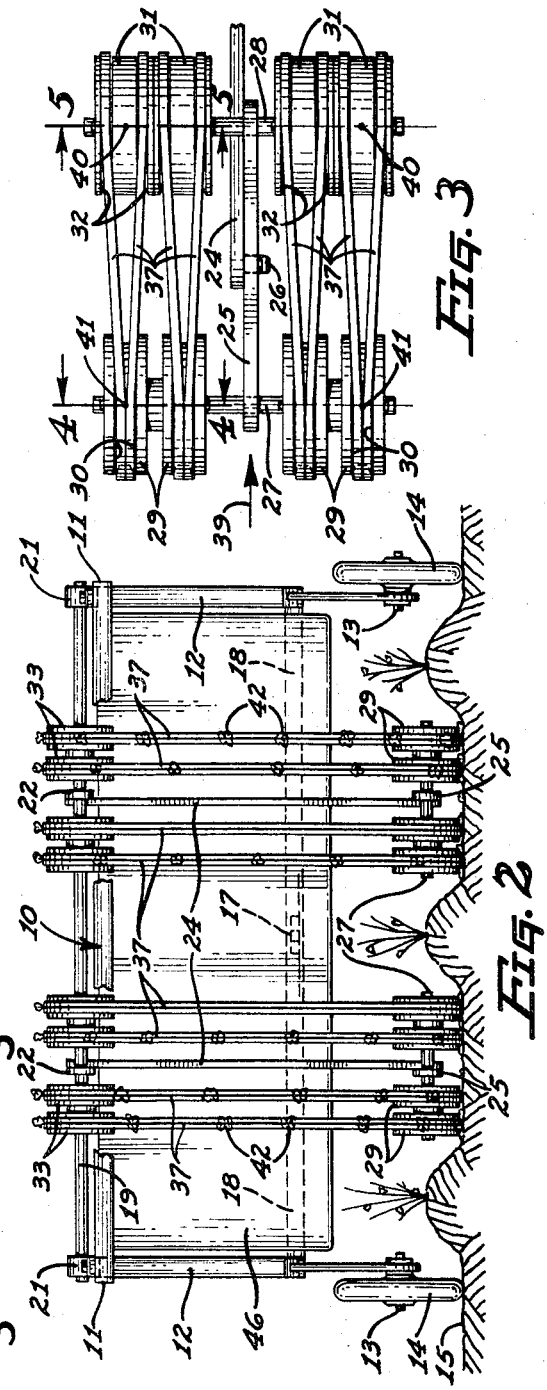
INVENTOR.
SAMUEL J. JENNINGS.
BY Willard S. Growe
ATTORNEY.

Nov. 5, 1968  S. J. JENNINGS  3,408,799
COTTON HARVESTING APPARATUS
Filed Sept. 19, 1966  2 Sheets-Sheet 2

INVENTOR.
SAMUEL J. JENNINGS.
BY
Willard G. Groen
ATTORNEY.

United States Patent Office 3,408,799
Patented Nov. 5, 1968

3,408,799
COTTON HARVESTING APPARATUS
Samuel J. Jennings, Phoenix, Ariz.
(Pima Road, P.O. Box 3546, Scottsdale, Ariz. 85257)
Filed Sept. 19, 1966, Ser. No. 580,353
3 Claims. (Cl. 56—28)

This invention pertains to agricultural machinery and more particularly to apparatus for harvesting and picking up cotton that has fallen to the ground from the cotton plants.

This application is related to Patent 3,217,475, issued Nov. 16, 1965, in that it discloses similar cotton grasping structure.

One of the objects of this invention is to provide a cotton harvesting machine that is simple in construction and trouble-free in operation.

Another object is to provide a cotton pick-up apparatus in which the cotton plant stalks and bolls cannot be injured or contaminated with soil, dirt and trash during the pick-up operation.

A further object is to provide a cotton pick-up apparatus in which there are no beating and no twisting and entangling of the cotton during the pick-up operations.

And a further object is to provide a plurality of laterally spaced and angularly disposed moving belts providing diverging and converging sections adapted to ride on and move over the ground surface of the field during the pick-up operations while picking, securing and releasing cotton from the ground surface of the field.

And it is a still further object to provide the aforementioned pick-up belt system in which the belts roll along the plant rows performing the pick-up functions while the belts move in Caterpillar tread fashion on the ground surface.

Further features and advantages of this invention will appear from a detailed description of the drawings in which:

FIG. 1 is a side elevation of cotton harvesting apparatus incorporating the features of this invention.

FIG. 2 is a rear end elevation of the apparatus shown in FIG. 1.

FIG. 3 is an enlarged bottom view of the pick-up belts indicated by the line 3—3 in FIG. 1.

Figure 4:
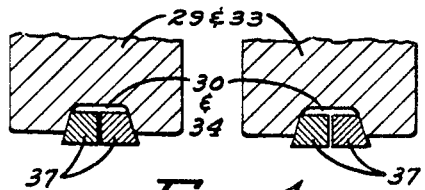
FIG. 4 is an enlarged fragmentary view on the line 4—4 of FIG. 4.
Figure 5:
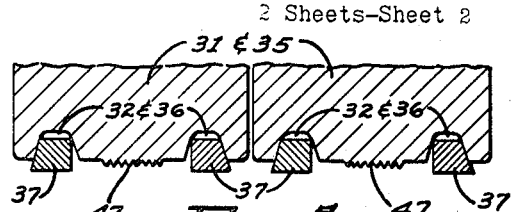
FIG. 5 is an enlarged fragmentary view on the line 5—5 of FIG. 4.

As an example of one embodiment of this invention there is shown a cotton pick-up apparatus comprising a frame indicated generally at 10 comprising laterally spaced side rails 11 having downwardly extending supports 12 terminating at their lower ends at axles 13 fixed thereto which carry ground engaging wheels 14 arranged to roll on the ground surface 15 of the field.

Suitable struts 16 are interconnected between the side rails 11 and the supports 12 for rigidity of the ground wheel supports. A hitch 17 is carried on a suitable bracket structure 18 fixed to the side rails 11 for towing the frame on the ground wheels 14 by a suitable tractor connected to the hitch 17.

The cotton pick-up apparatus comprises a pair of laterally disposed shafts 19 and 20 journaled in suitable support brackets 21 fixed to the side rails 11. An upper link 22 is mounted at each end on the shafts 19 and 20 and pivotally mounted on a suitable pin 23 is the downwardly and rearwardly extending connecting arms 24.

Lower links 25 are pivotally mounted intermediate their ends on pins 26, laterally disposed shafts 27 and 28 being mounted in the outer ends of the lower links 25. Pulleys 29 each having a common wide annular groove 30 are suitably journaled on the shaft 27 and pulleys 31 are suitably journaled on the shaft 28 each having axially spaced grooves 32. Suitably journaled on the shaft 19 of the upper link 22 are the pulleys 33 each having a common wide annular groove 34 and on the shaft 20 is journaled the pulleys 35 having the axially spaced annular grooves 36. Suitable belts 37 which may take the form of V-belts, round belts, plastic cords, cables or wires, and the like are arranged to operate over the pulleys and the described annular grooves formed therein.

In operation, the described unit is towed in the direction indicated by the arrow 39 with the belt run between the points 40 and 41 floatingly engaging the ground surface as provided by the connecting arm 24 and the pivotally mounted lower link 25 as described. In proceeding over the cotton 42 lying on the ground surface 15 the belts 37 converge from point 40 to 41 thus laterally moving toward each other over the ground surface to trap and pick up the cotton between the belts as the point 41 is reached. The run of the belts between the pulleys 29 and 33 is such that the belts remain in lateral sidewise contact holding the picked up cotton 42 pinched between the belts as the cotton is moved upwardly in the direction of the arrow 43.

As the belts 37 move from position 44 atop the pulleys 33 to the discharge point 45 the belts diverge laterally from each other releasing the trapped cotton between them so that when the cotton reaches the pulleys 35 it is flipped into the catching sack or box 46 suitably carried on the frame 10 of the machine. The belts continue on downwardly from pulleys 35 back to pulleys 31 in laterally spaced condition ready to begin the described pick-up cycle again. Suitable roughened or raised portions 47 may be formed on the peripheries of the pulleys 35 to facilitate the removal of the cotton from the diverging belts and flipping it into the catching box 46. Normally, the ground contact between the belts and the ground surface 15 along the contact area 40–41 is sufficient to drive the belt system described but iti s understood that it is within the scope of this invention to also utilize a power drive for the belts operating in synchronism with the movement 39 of the machine over the field as required. The machine described above is particularly adapted to pick up fallen cotton that is deposited down the middle of the furrows between each plant row.

Figure 6:
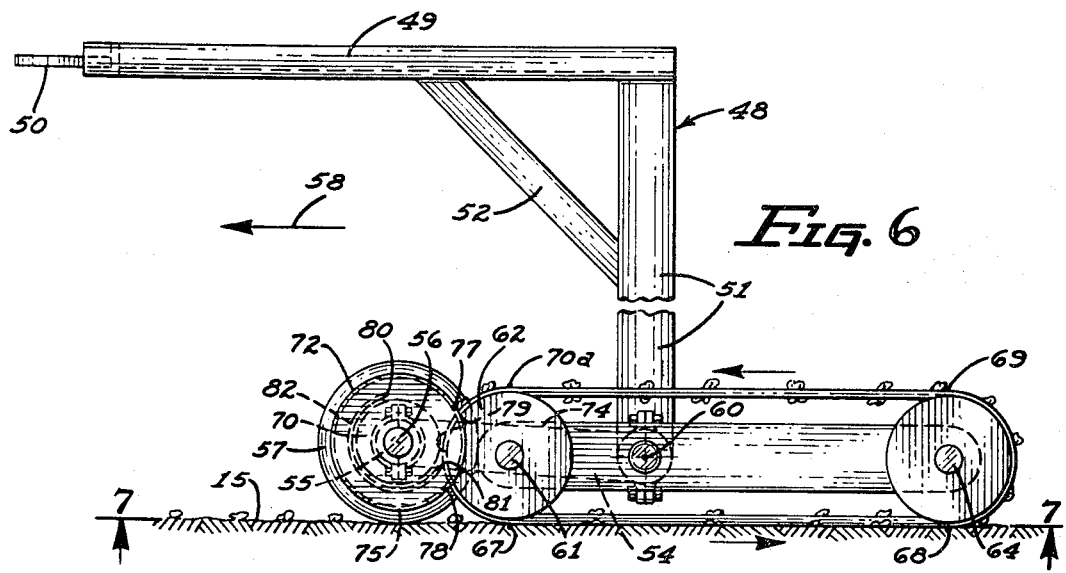
FIG. 6 is a side elevation of a modification of the apparatus in FIG. 1.
Figure 7:
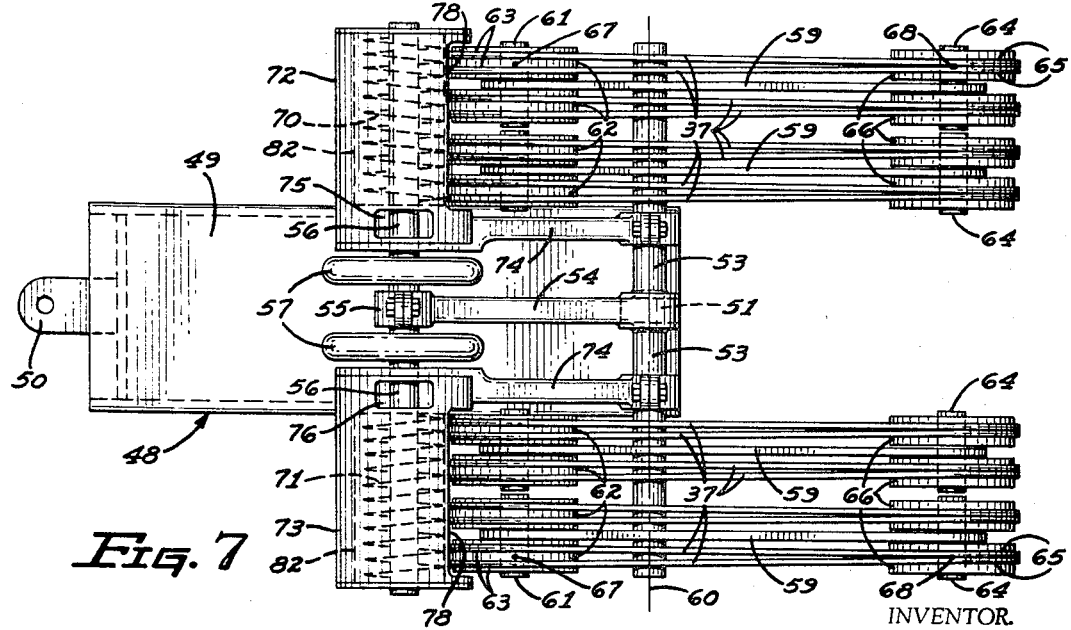
FIG. 7 is a bottom view indicated by the line 7—7 of the apparatus shown in FIG. 6.

The apparatus shown in FIGS. 6 and 7 is a modification of the above described apparatus particularly arranged for removing seed cotton from underneath stalks to the center portion of the furrows for final pick-up as described. To this end there is provided a machine having a frame indicated generally at 48 having a horizontal hitch bar 49 with a hitch 50 on the forward end thereof and a downwardly extending arm 51 rigidly secured to the horizontal arm 49 by a suitable strut 52.

Extending laterally each side of the bottom end of the arm 51 is the pivot bar 53 and also fixed to the lower end of the arm 51 is the forwardly extending ground contacting wheel support bar 54 in the outer end of which is carried a suitable bearing 55 upon which is journaled the combination support and screw conveyor shaft 56. Ground contacting support wheels 57 are suitably fixed to the shaft 56 and thereby support the frame 48 as it is towed over the surface 15 of the field in the direction indicated by the arrow 58.

Pivotally mounted on the pivot bar 53 each side of the wheels 57 and vertical arm 51 of the frame 48 are a series of lower links 59 each independently pivotally mounted intermediate their ends to swing about the transverse horizontal axis 60. On the forward end of each link 59 is a stub shaft 61 journaling on each side of the link a pulley 62 having axially spaced individual annular belt grooves 63 while on the rear end of the link 59 is fixed a stub shaft 64 upon each side of which is suitably journaled the single wide groove 65 pulleys 66. Suitable belts as described for the apparatus in FIGS. 1-5, are operatively mounted in the grooves of the pulleys so that the belts riding on the ground surface are convergent laterally from the front point 67 of ground contact to the rear point of ground contact 68, and are divergent from the point 69 of belt return to the point 70a of discharge of the picked up cotton.

Fixed on each end of the shaft 56 are the left hand screw conveyor spiral 70 and the right hand screw conveyor spiral 71 which are surrounded with the conveyor housings 72 and 73 fixed to the outer ends of the housing arms 74 in turn fixed to the pivot bar 53 of the frame 48. Downward discharge ports 75 and 76 are formed in the bottom portions of the housings 72 and 73 adjacent the ground wheels for deposition of the picked up cotton in closely spaced rows along the center of the furrows each side of the plant rows.

A slotted opening between the points 77 and 78 arranged to receive a portion of the periphery 79 of the pulleys 62 and the portions of the belts 37 thereon so that the laterally spaced belts in this portion of their travel will release and discharge the picked cotton and drop it into the conveyor housing where it will pass through the opening 80–81 formed in the shroud 82 so that the screw conveyors 70 and 71 convey the picked up seed cotton and deliver it for discharge through the discharge ports 75 and 76 onto the ground as the wheels roll along on the ground surface 15. Any other suitable collecting system may be used such as applying the usual suction pipe to the housings 72 and 73 in place of the screw conveyors 70 and 71 and the ground discharge ports 75 and 76 and collect the cotton in a collector box or sack.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters patent is:

1. A cotton pick-up apparatus comprising in combination:
   (A) a frame,
   (B) a hitch on said frame,
   (C) ground engaging wheels journaled on said frame to support said frame when towed over the ground surface of a field.
   (D) a pair of radially spaced pulleys floatingly mounted on said frame and arranged to yieldingly roll over the ground so as to conform to the irregularities of the surface thereof,
   (E) a pair of belts operating over said pulleys and in contact with the ground surface,
   (F) and annular grooves in said pulleys arranged to receive said belts so that said belts move in laterally converging direction to sidewise abutting engagement from a laterally spaced position relative to the direction of travel of said belts and pulleys over the ground surface to thereby laterally grip seed cotton on the ground and deliver the same to a discharge position on said frame.

2. In a cotton pick-up machine as set forth in claim 1 wherein means are provided on said frame for receiving picked up seed cotton from said discharge position of said belts and depositing the same in a remote storage receptacle on said frame.

3. In a cotton pick-up machine as set forth in claim 1 wherein means are provided on said frame for receiving picked up seed cotton from said discharge position of said belts from an area adajcent the plant row and re-depositing said cotton along the furrow between said plant rows for subsequent pick-up and removal.

References Cited
UNITED STATES PATENTS

| | | | |
|---|---|---|---|
| 24,609 | 7/1859 | Bishop | 56—49 |
| 2,670,584 | 3/1954 | Rood et al. | 56—28 |
| 2,928,224 | 3/1960 | Powell | 56—28 |
| 3,217,475 | 11/1965 | Jennings | 56—49 |

RUSSELL R. KINSEY, *Primary Examiner.*